Patented Nov. 13, 1951

2,574,518

UNITED STATES PATENT OFFICE 2,574,518

ORGANIC COMPOUNDS CONTAINING PHOSPHORUS AND BROMINE

George E. Walter, Baltimore, and Irwin Hornstein, East Riverdale, Md., assignors to The Glenn L. Martin Company, Middle River, Md., a corporation of Maryland No Drawing. Original application November 26, 1948, Serial No. 62,233. Divided and this application April 27, 1951, Serial No. 223,839

3 Claims. (Cl. 260—461)

In the co-pending application of George E. Walter and Irwin Hornstein, Serial No. 62,233, filed November 26, 1948, organic polymers containing phosphorus and halogen are described, which are suitable for various uses, particularly for rendering flameproof any inflammable material, such as textiles of all kinds, including cotton and rayon, for preparing flameproof films, plasticizers, for insecticides, and several other applications. That method consists substantially in preparing halogenated poly-alkene phosphates and halogenated poly-dialkene phosphates, for instance poly-bromo-triallyl phosphates and poly-bromo-dialkene amido phosphates. In particular, effective flameproofers can be prepared which, due to their polymerization, supply their own resinous binder so that no foreign binder is needed. We found that bromine is many times more effective than chlorine.

We have now found that the superiority of bromine over chlorine which we found in the polymers also comes distinctively into appearance when the monomers themselves are brominated, whether or not all double bonds, or only part of them, are brominated. In practically all applications and especially in the flameproofing field that effect has been established. Though the brominated monomers do not give as permanent flameproofing finishes as the polymers, they impart a very desirable "feel" to the textile, and in cases where high permanence toward laundering and dry cleaning is not relevant, the monomers can be applied successfully instead of the polymers.

In the flameproofing field, the difference between the brominated and chlorinated compounds is a fundamental one rather than one of degree. While the chlorinated compounds act merely as flame retardent agents, the brominated compounds are excellent flameproofers, particularly when there are two bromine atoms in the molecule on adjacent carbon atoms. Furthermore, leaving at least one double bond of the original unsaturation of the monomer intact seems to help in making the compounds adhere to a somewhat higher degree on the fabric.

Thus, one object of this invention is to prepare brominated derivatives of certain alkene phosphates by addition of bromine to an alkene phosphate derivative.

Another object is to prepare brominated alkene phosphate derivatives having at least two bromine atoms in the molecule on neighboring carbon atoms.

Still another object of the present invention is to prepare halogenated, particularly brominated, derivatives of dialkene amido phosphates.

This application is a division of our co-pending application Serial No. 62,233, filed November 26, 1948, which in turn is a continuation-in-part of application Serial No. 761,147, George E. Walter and Irwin Hornstein, filed July 15, 1947, now abandoned.

It is interesting to note that the brominated alkene phosphates are effective flameproofers for both cellulose and cellulose acetate type textiles, while corresponding chlorinated compounds acted as retardents only, and were particularly of no great value on cotton.

Brominated alkene phosphates have been found very useful as plasticizers in several resin and like materials where the flameproofing effect is an additional advantage. Thus flameproof films of vinyl type resins and cellulose acetate can be produced by plasticizing those materials with brominated tri-allyl phosphate. Triallyl phosphate itself can be used as a binder for the brominated material if the latter is introduced in the non-brominated monomers with subsequent polymerization. In the co-pending application of George E. Walter, Clarence A. Sheld and Irwin Hornstein, Serial No. 62,235, filed November 26, 1948, a process is described of incorporating hexabromotriallyl phosphate in triallyl phosphate, impregnating textile with a solution of the mixture and polymerizing triallyl phosphate in the presence of a peroxide catalyst and in a nitrogen atmosphere, resulting in a flameproof textile finish.

Dialkene amido phosphates can be brominated to give useful compounds suitable for use, as example, as flameproofers in accordance with the present invention. The preparation of the dialkene amido phosphates is described in the co-pending application of George E. Walter, Irwin Hornstein and George M. Steinberg, Serial No. 62,234, filed November 26, 1948. These compounds on bromination give highly effective flameproofing compounds which are useful where water soluble types can be applied. Compounds of this type which are included within the scope of the present invention are those included within the following formula:

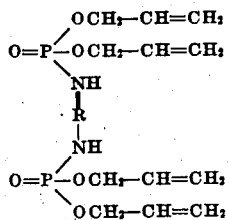

The following example illustrates the preparation and uses of these compounds:

EXAMPLE

Octabromo N-N' methylene bis diallyl phosphonamide

To 366 parts of N-N' methylene bis diallyl phosphonamide dissolved in 1000 parts of mixture of 70 per cent ethylene dichloride-30 per cent isopropanol are added dropwise and at room temperature 640 parts of elementary bromine. When the addition is complete a few drops of concentrated ammonium hydroxide are added to neutralize the solution.

The solution is diluted to the desired concentration by adding as much of the 70-30 ethylene dichloride-isopropanol mixture as may be necessary.

Cellulose acetate and cotton fabrics impregnated with this solution when first dried at 100° C. for 2-3 minutes are quite tacky. Further heating at 120° C. for 15-20 minutes improves the "hand" materially. This material imparts a somewhat stiffer "hand" to Celanese (cellulose acetate) than the tetra bromo N-methylol diallyl phosphonamide. In addition, it is, however, dry-clean resistant. Cellulose acetate fabrics with a 25-30 per cent pick-up are completely flameproof and can withstand several dry-cleanings.

Cotton fabrics are flameproof with a 10-15 per cent pick-up and can resist several launderings in neutral soap solutions.

These brominated monomers are unexcelled flameproofers in cases where the need for permanency is not of the utmost importance. Some of the derivatives, such as the methylene derivatives of completely brominated diallyl phosphonamides, have a very marked affinity for cellulose materials. We think that perhaps some reaction may take place between the free hydroxyls in the cellulose molecules and these compounds.

By similar procedures, partially or completely brominated derivatives of N-N' ethylene bis diallyl amido phosphate can be prepared.

The preceding example is in no way restrictive of the invention and its application and is intended to illustrate only its use in the flameproofing field.

Apart from flameproofing, the compounds described are suitable for use in the preparation of germicides, fungicides, insecticides, mildewproofing agents, lubricating oil modifiers, and corrosion inhibitors.

It is to be understood that certain changes, alterations, modifications and substitutions can be made without departing from the spirit and scope of the appended claims.

We claim as our invention:

1. A brominated N-N'-methylene-bis-diallyl amido phosphate, having at least two bromine atoms per molecule.

2. A brominated N-N'-ethylene-bis-diallyl amido phosphate, having at least two bromine atoms per molecule.

3. A compound obtained by brominating an unsaturated aliphatic phosphonamide derivative having the formula:

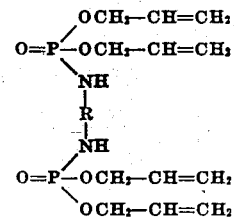

where R is selected from the class consisting of methylene and ethylene radicals.

GEORGE E. WALTER.
IRWIN HORNSTEIN.

No references cited.